United States Patent [19]

Baumert et al.

[11] Patent Number: 4,687,254

[45] Date of Patent: Aug. 18, 1987

[54] BELT LOCK ARRANGED RECESSED IN A POCKET OF A SEAT PART

[75] Inventors: Heinz Baumert, Sindelfingen; Nikolaus Schmitt-Maass, Boeblingen; Erich Karb, Calw-Alzenberg, all of Fed. Rep. of Germany

[73] Assignee: Daimler-Benz Aktiengesellschaft, Fed. Rep. of Germany

[21] Appl. No.: 900,080

[22] Filed: Aug. 25, 1986

[30] Foreign Application Priority Data

Aug. 23, 1985 [DE] Fed. Rep. of Germany ....... 3530172

[51] Int. Cl.⁴ .............................................. B60R 21/00
[52] U.S. Cl. ...................................... 297/481; 297/482
[58] Field of Search ...................... 297/468, 481, 482; 280/801

[56] References Cited

U.S. PATENT DOCUMENTS

| | | | |
|---|---|---|---|
| 3,272,557 | 9/1966 | Nicholas | 297/482 |
| 3,841,658 | 10/1974 | Singh | 297/482 |
| 4,210,365 | 7/1980 | Breitschwerdt | 297/481 |
| 4,542,939 | 9/1985 | Geoffrey | 297/481 |
| 4,560,203 | 12/1985 | Huber | 297/481 |

Primary Examiner—Francis K. Zugel
Attorney, Agent, or Firm—Barnes & Thornburg

[57] ABSTRACT

In order to bring about a single-handed actuation during the insertion operation of the buckle latch into a belt buckle arranged recessed in its non-use position in a pocket of a seat part, the pocket is lined by a shell and the shell is provided with a guide surface along which slides the emplaced buckle latch in the direction of the receiving funnel of the belt buckle. The guide surface may be provided with a guide groove for the positionally correct latch guidance. However, also a push button may extend therethrough whereby the stroke movement produced by actuation by the belt latch is transmitted onto the belt buckle by means of a transmission device.

6 Claims, 4 Drawing Figures

BELT LOCK ARRANGED RECESSED IN A POCKET OF A SEAT PART

The present invention relates to a seat belt latch mechanism or belt buckle arranged recessed in its non-use position in a pocket of a seat part, especially of a rear seat in a motor vehicle, elastically stressed and provided with a receiving funnel, which is adapted to be transferred by means of a pivot movement from its non-use position into a use position permitting the insertion of the buckle latch.

A belt buckle arranged in such a manner is disclosed in the DE-OS No. 33 16 608. In order to be able to insert the buckle latch with one hand into the seat buckle or latch mechanism, it is necessary preliminarily to pivot the latch mechanism slightly out of the pocket by means of the other hand.

It is the object of the present invention to so change the location of accommodation for the belt buckle that the belt buckle in the course of the insertion movement of the buckle latch is transferred into a position which—without having to use another hand for assist—permits a simple insertion of the buckle latch.

The underlying problems are solved according to the present invention in that the pocket is lined by a shell and the latter is provided with a guide surface, along which the emplaced buckle latch is conducted in the direction of the receiving funnel of the belt buckle.

A still better alignment of the buckle latch during the insertion operation is achieved if the guide surface is provided with a guided groove matched to thickness of the buckle latch.

In another embodiment according to the present invention, a push button guided at the shell extends through the guide surface so that when pressing-in the bush button the adduced stroke movement is transmitted by the buckle latch to the belt buckle or latch mechanism under interconnection of a transmission device.

These and other objects, features and advantages of the present invention will become more apparent from the following description when taken in connection with the accompanying drawing which shows, for purposes of illustration only, several embodiments in accordance with the present invention, and wherein.

Figure 2:
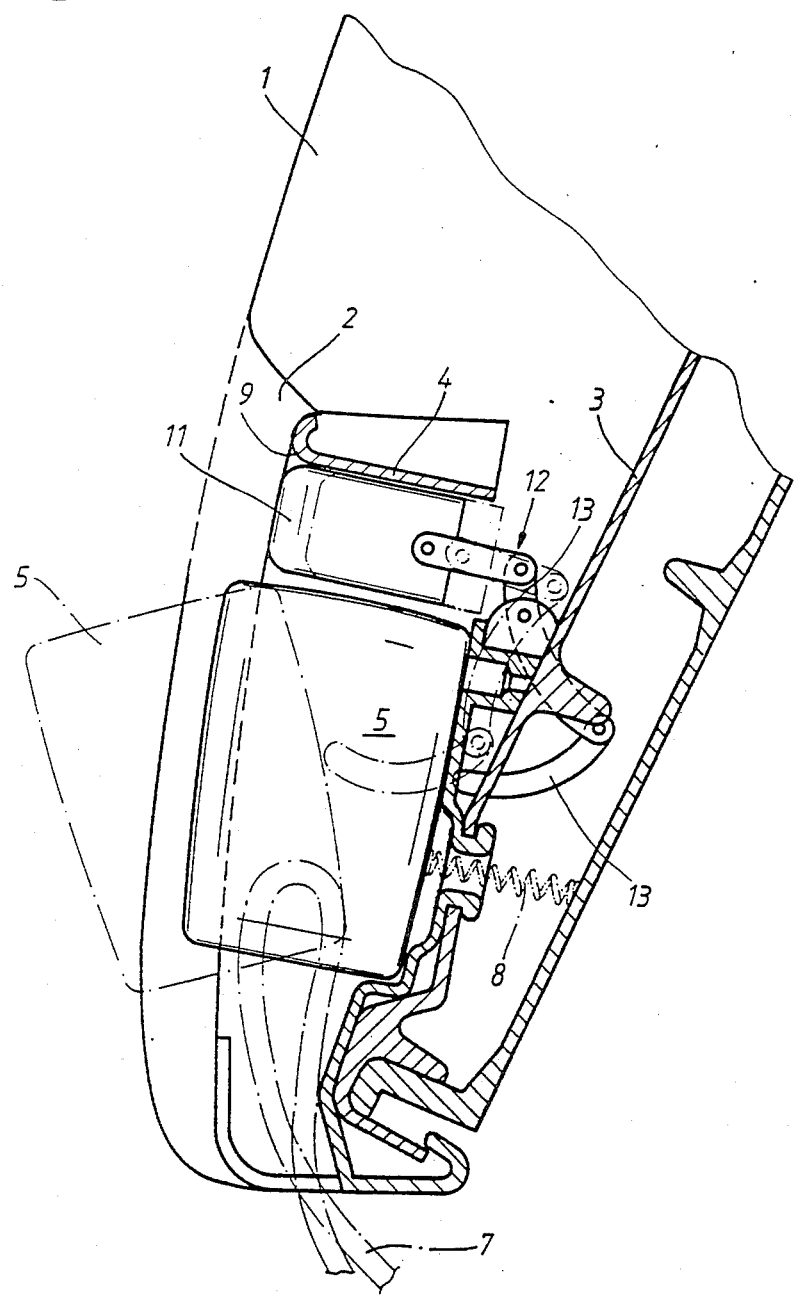
FIG. 2 is a cross-sectional view through a modified embodiment in accordance with the present invention with a push-button extending through the guide surface and with a transmission device connected behind the push button in the form of a lever linkage.
Figure 3:
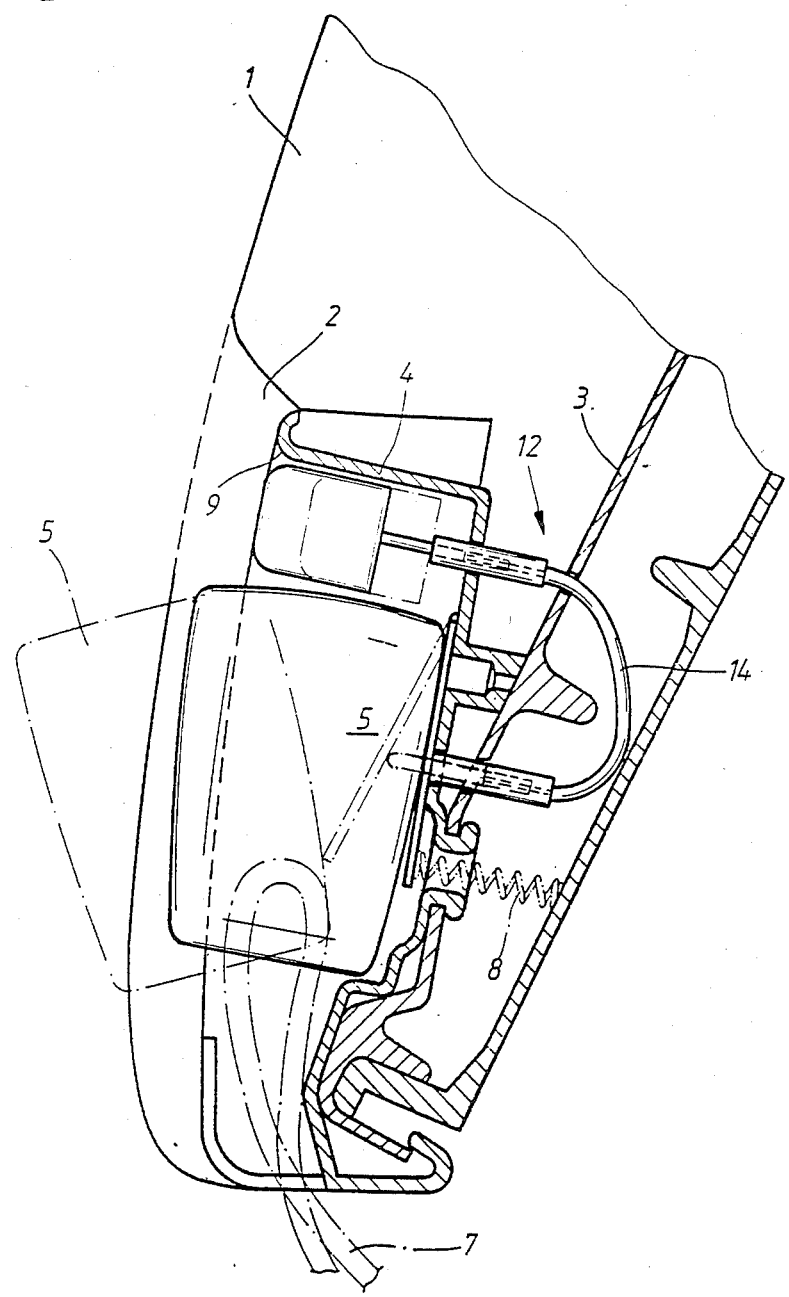
Figure 4:
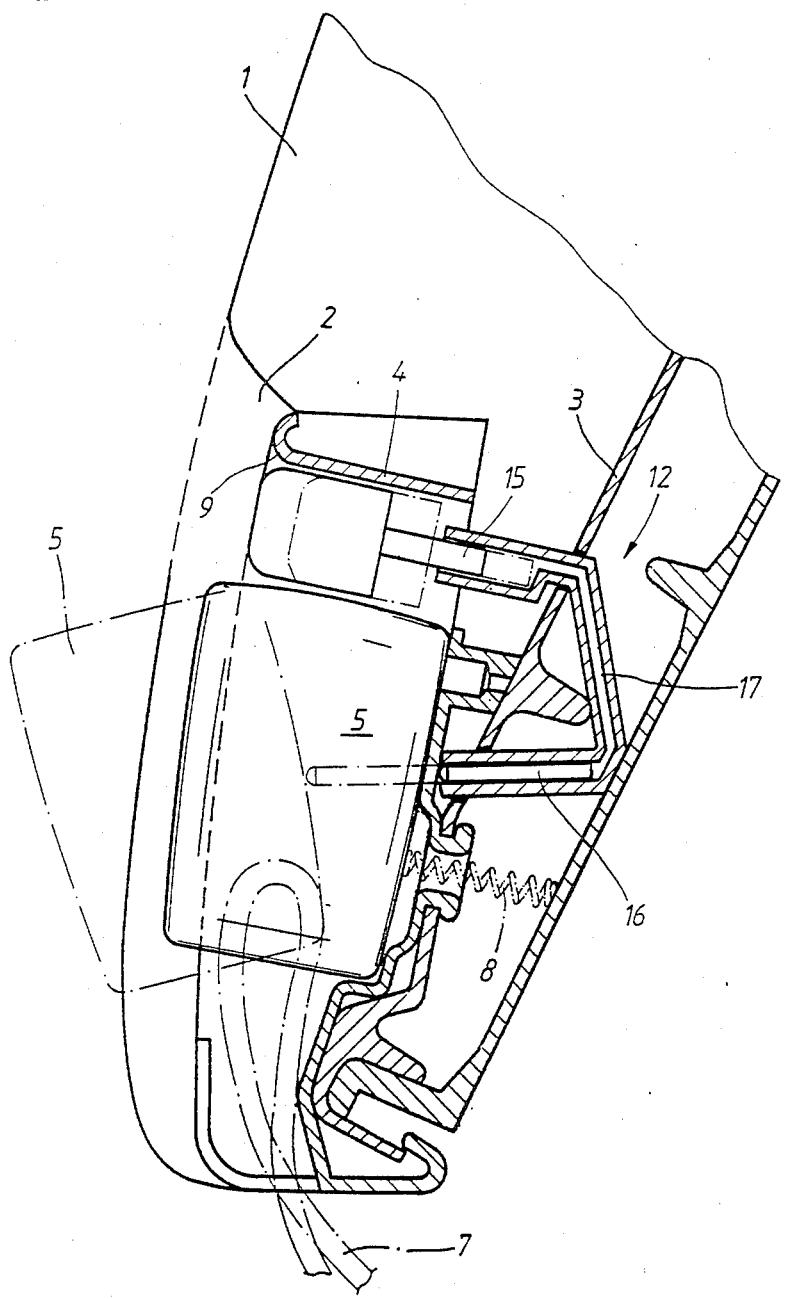

FIG. 3 is a cross-sectional view of a still further modified embodiment in accordance with the present invention, similar to FIG. 2, with a transmission device in the form of a guided draw; and FIG. 4 is a cross-sectional view through still a further embodiment in accordance with the present invention with a push button whereby the transmission device is constructed as connecting line with pistons at the ends thereof.

Figure 1:
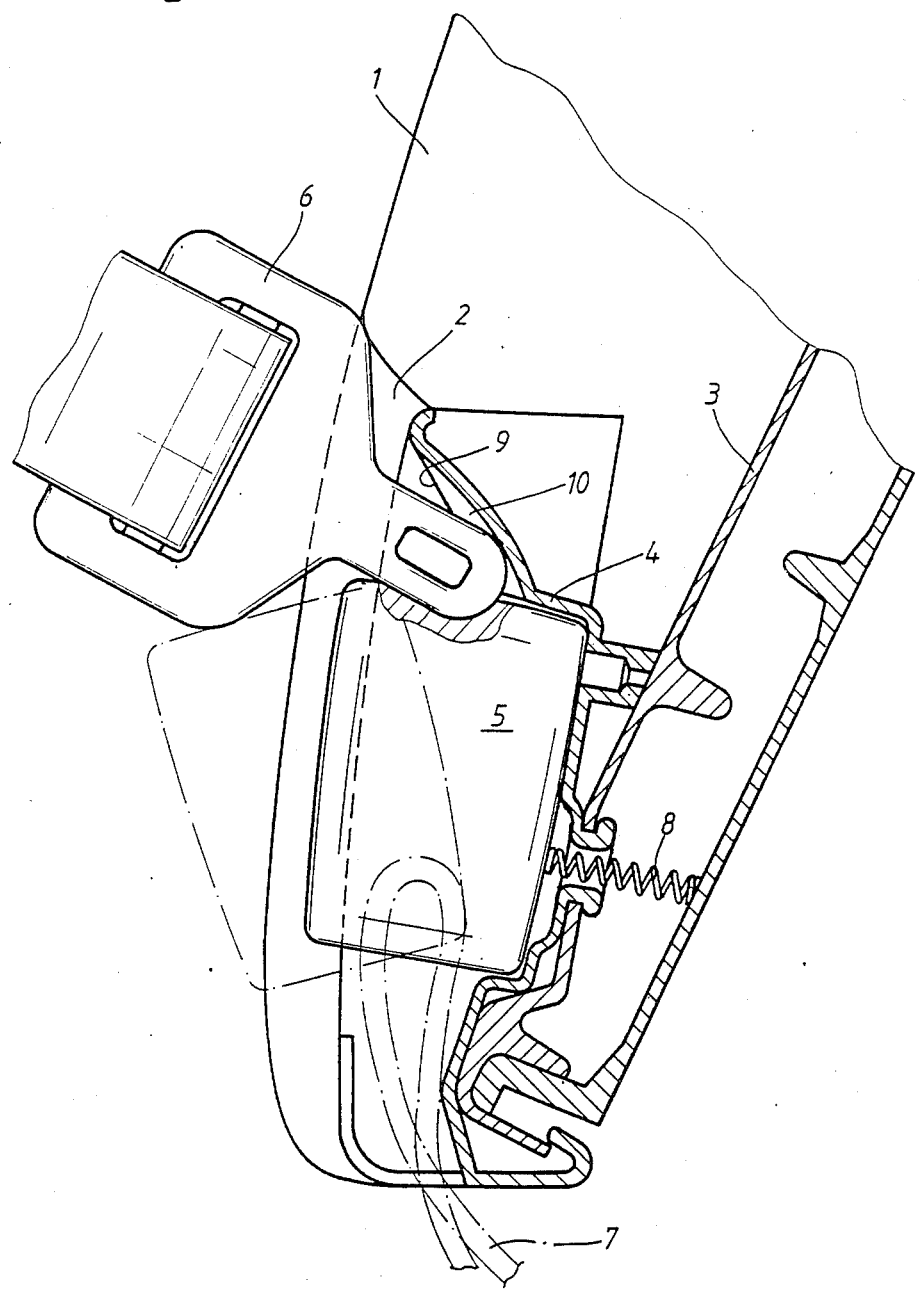
FIG. 1 is a cross-sectional view through a pocket in the backrest lined by a shell for receiving a belt buckle in accordance with the present invention, whereby the guide surface of the shell includes a guide groove for the buckle latch.

Referring now to the drawing wherein like reference numerals are used throughout the various views to designate like parts, according to FIG. 1, a pocket 2 is inset in the padding 1 of a rear seat backrest (not shown) which is lined with a shell 4 fixed at a backrest frame part 3. A seat belt buckle or latch mechanism 5 which is provided in a known manner (not shown) with a receiving funnel for the more convenient insertion of a buckle latch 6, rests in its non-use position recessed in the shell 4. The buckle latch 5 is operatively connected with the vehicle body (not shown) by way of a cable section 7 and is held in its non-use position by the elastic prestress of the cable section 7 and/or a spring 8.

The shell 4 is provided on the side facing the receiving funnel of the belt buckle 5 with a guide surface 9 in which a guide groove 10 matched to thickness of the belt latch 6 is inset. If the belt latch 6 is placed against the guide surface 9, then it enters into the guide groove 10 and slides within the same in the direction of the receiving funnel of the seat belt buckle or latch mechanism 5. Once the receiving funnel is reached, the belt buckle 5 is moved with lever action by the buckle latch 6 for such length of time until the buckle latch 6 can enter the seat belt buckle or latch mechanism 5 which then assumes the use position shown in dash-and-dotted lines. If the connection between the belt buckle 5 and the buckle latch 6 is again released, then the return moment of the cable section 7 and/or of the spring 8 which can also be constructed as a rubber strip or draw element, again comes into play.

In the embodiment according to FIG. 2 which corresponds in its basic construction to that of FIG. 1, a push button 11, which extends through the guide surface 9, is guided by the shell 4 safe against tilting. A transmission device generally designated by reference numeral 12, which adjoins the push button 11, is constructed as lever linkage 13 so that in case the push button 11 is depressed by the belt latch 6 illustrated in FIG. 1, the free end of the lever linkage abutting at the belt buckle 5 moves the belt buckle 5 so far out of its non-use position by reason of the occurring stroke movement that the buckle latch 6 is guided by the depressed push button 11 directly into the receiving funnel of the belt buckle.

In contrast to the embodiment according to FIG. 2, the transmission device 12 consists, according to FIG. 3, of a guided draw member 14, such s a cable, transmitting pressure forces whereas the transmission device 12 in the embodiment according to FIG. 4, is constructed as connecting line 17 provided at each end with a piston 15 and 16. It is thereby possible in a particularly simple manner by changing the piston diameter to obtain a desired transmission ratio.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A seat belt latch mechanism arranged recessed in its non-use position in a pocket of a seat part, elastically stressed and provided with a receiving funnel, which can be transferred by means of a pivot movement from its non-use position into a use position enabling the insertion of a buckle latch, comprising shell means lining the pocket, said shell means being provided with a guide surface means, along which the emplaced buckle latch slides in the direction of the receiving funnel.

2. A latch mechanism according to claim 1, wherein the guide surface means is provided with a guide groove matched to the thickness of the buckle latch.

3. A buckle mechanism according to claim 1, further comprising a push button extending through the guide surface means, said push button being guided in said shell means, and transmission means for transmitting to the latch mechanism the stroke movement produced by the latch by depressing the push button.

4. A latch mechanism according to claim 3, wherein the transmission means includes a lever linkage.

5. A latch mechanism according to claim 3, wherein the transmission means is constructed as guided draw means transmitting pressure forces.

6. A latch mechanism according to claim 3, wherein the transmission means includes a connecting line provided with a piston at each end thereof.

* * * * *